July 31, 1956 R. V. LACKNER 2,757,265
ELECTRICAL INDUCTION HEATING COIL AND METHOD OF PRODUCTION
Filed March 4, 1953 2 Sheets-Sheet 1
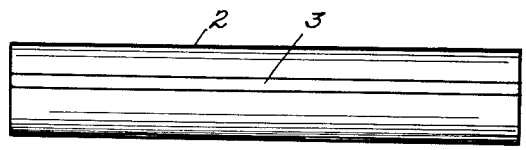
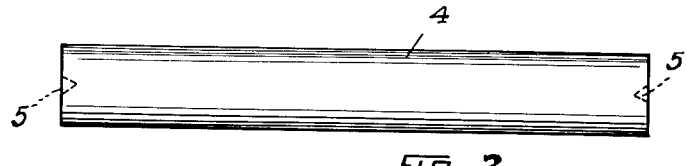
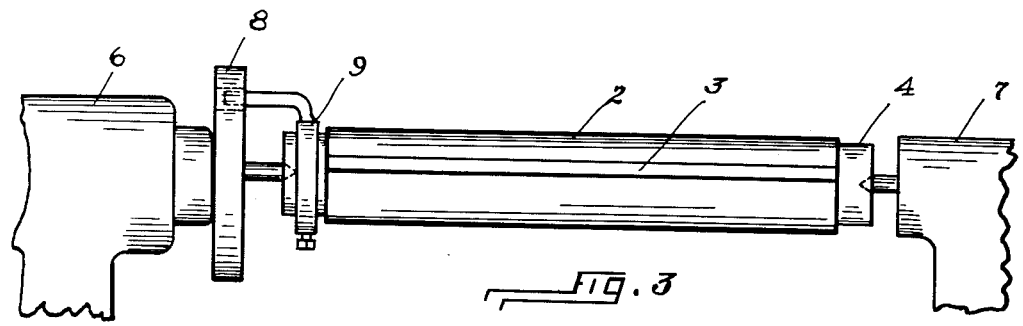
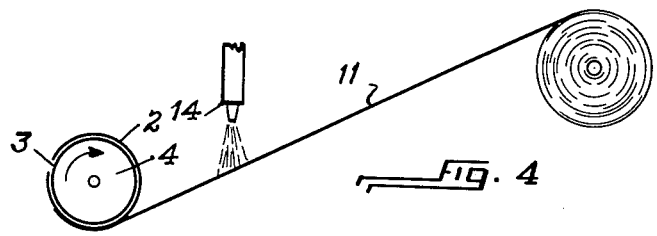
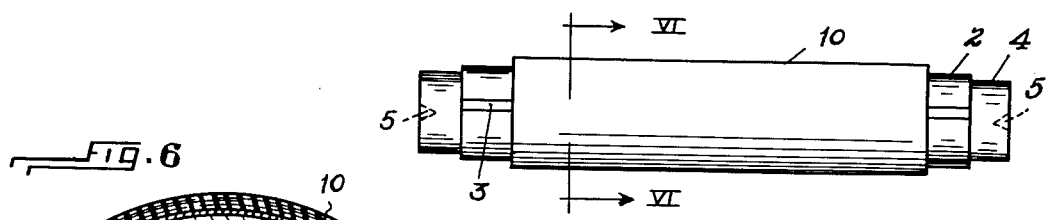
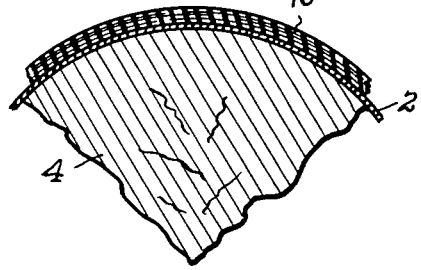
INVENTOR.
Robert V. Lackner
BY
Christy, Parmelee and Strickland
his attorneys July 31, 1956  R. V. LACKNER  2,757,265
ELECTRICAL INDUCTION HEATING COIL AND METHOD OF PRODUCTION
Filed March 4, 1953  2 Sheets-Sheet 2

INVENTOR.
Robert V. Lackner
BY
Christy, Parmelee and Strickland
his attorneys

United States Patent Office 2,757,265
Patented July 31, 1956

2,757,265

ELECTRICAL INDUCTION HEATING COIL AND METHOD OF PRODUCTION

Robert V. Lackner, Pittsburgh, Pa., assignor to Loftus Engineering Corporation, a corporation of Maryland Application March 4, 1953, Serial No. 340,209

2 Claims. (Cl. 219—10.41)

This invention relates to low-frequency electrical induction heating units, and consists in improvements both in the structure of such units and in the method of their manufacture.

In recent years the heating of metal billets for forging, or extruding, or other forming operation, has been advantageously accomplished by means of low-frequency (60-cycle) electrical induction heating units. Such a unit consists essentially of a helical coil formed of a metallic conductor having a relatively low electrical resistance, and ordinarily such conductor is formed of copper bar or tubing having a passage therethrough for the flow of cooling water. The preferred practice hitherto has been to employ as the conductor a copper bar of rectangular or square cross section, to which copper tubing for the circulation of cooling water is brazed throughout the effective length of the bar. The turns of such water-cooled bar are encased within a stocking or sleeve of glass fabric which is saturated and integrated by means of an insulating silicon varnish, with which varnish the art is familiar. The so-encased coils or turns of the bar are compressed axially of the helix, whereby the structure becomes in effect a cylinder formed by the encased coils of the water-cooled conductor.

Within the coil thus constructed a thin metal liner is secured, and it is within such liner that the billet to be heated is supported, while electric current and cooling water are passed through the conductor. The flowing current induces in the body of the contained billet voltage differentials which cause currents to flow. In consequence of the flowing currents in the body of the billet heat is generated by the electrical resistance losses, and such heat raises the temperature of the billet to the required temperature, whereupon the billet is removed and delivered to the forging or extrusion press, or other forming apparatus.

In the manufacture of induction heating units in the past, the water-cooled copper conductor is coiled upon a mandrel specifically made for the particular diameter of coil to be constructed. In those cases in which the water passage for the conductor is formed by tubing brazed to the copper bar, the brazing of the tubing to the bar is performed progressively as the coil is wound upon the mandrel. When wound, the coil is removed from the mandrel. Then the woven glass sleeve or stocking is laboriously slid over the coiled conductor body, turn after turn. Upon adjusting and smoothing out the applied glass fabric sleeve, several inlet and outlet leads for the cooling water are brazed to the conductor at desired points along the length of the coil (the sleeve of glass fabric being opened at such points), and then the sleeve is saturated with the insulating varnish. Next, the coil is axially compressed between two end boards or heads of insulating material, and the turns of the coil, jacketed within the varnished sleeve, are tightly pressed and rigidly secured turn against turn. And finally, the cylindrical liner of thin sheet metal, laterally covered with a thin web of varnished cambric, is slipped into place within the coil. The sleeve is of such length that it extends outward through the end boards or heads to which the projecting ends of the sleeve are severally secured.

In accordance with the objects of my present invention, I have perfected a simpler, faster and more economical method of manufacturing an electrical induction unit than any which has been employed heretofore. The invention also embraces the product of the improved method.

The invention will be understood upon reference to the accompanying drawings, in which:

Fig. 1 is a view in side elevation of a tubular sleeve that comprises an essential element of a low-frequency induction coil unit;

Fig. 2 is a view in side elevation of a certain mandrel or axle employed in the practice of the invention;

Fig. 3 is a view in side elevation of the sleeve assembled upon the axle, with the assembly mounted in a winding or coiling machine, which is fragmentarily indicated;

Fig. 4 is a diagrammatic view in end elevation of the assembled axle and sleeve, arranged to receive a wrapped-on jacket of sheet insulating material;

Fig. 5 is a view in side elevation of the assembled axle and sleeve, with the wrapped jacket completely applied;

Fig. 6 is a fragmentary sectional view, showing on relatively large scale the axle and sleeve with the applied insulating jacket;

Figure 7:
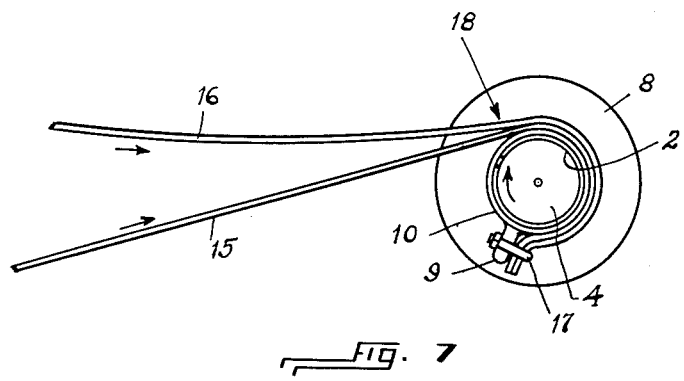
Fig. 7 is a diagrammatic view in end elevation of the mandrel and jacketed sleeve in course of having the conductor coiled upon it.

Referring to Fig. 1, the liner 2 of an induction coil unit is illustrated in side elevation. The liner in this case is of hollow cylindrical form, fashioned of a sheet of a tough, wear resistant material, such as stainless steel, say a sheet from one-sixteenth to three-sixteenths of an inch in thickness. The sleeve is slit or parted longitudinally, as indicated at 3, to interrupt or prevent in service the flow of induced current circumferentially of the sleeve. In accordance with the method of my present invention the sleeve is placed upon an axle 4 having centered sockets 5 at its two ends, whereby the assembled axle and sleeve may be mounted upon and between the centers of a head-stock 6 and tail-stock 7 of a lathe or coiling machine, as shown in Fig. 3. Suitable means are provided for attaching the mandrel to the driven head 8 of the coiling machine, in this case a conventional dog 9 being illustrated.

Upon the outer surface of the liner 2 a durable jacket 10 of insulating material is applied and secured. Advantageously, if not essentially, such jacket is of laminar structure, comprising a strip of tough insulating material, such as asbestos, or a thin cambric, or the like, wound into a tube and secured upon the liner 2, as indicated at 10 in Figs. 5 and 6. The tube 10 is preferably formed by winding the insulating strip material 11 (Fig. 4) immediately upon the axle-supported sleeve 2 mounted in and rotated by the coiling machine. More specifically, the strip 11 is cemented at its otherwise free end 12 to the surface of the sleeve 2, and the assembled axle and sleeve are slowly rotated in the machine in the direction indicated by an arrow in Fig. 4. During such rotation the strip is drawn from a supply roll 13 and progressively wound upon the surface of the sleeve 2.

As the operation progresses a heat-resisting glue, varnish, or cement, of a sort with which the art is familiar, is uniformly applied to the surface of the strip, say by means of a paint brush, or, as here shown, by means of one or more spray nozzles 14. In this manner the jacket 10 may be constructed and applied to the liner 2. The structure of the jacket, having as it does a laminar body wherein the laminae or turns of sheet material are cemented and bonded one to the other, is very strong, tough and peculiarly adapted to serve not only as insulation between the liner and the conductor coil of the finished induction unit, but also to serve—and this is a notable feature—as a mandrel element per se, upon which the copper is permanently coiled and secured.

The jacket 10, preferably of the cemented laminar structure described, provides in conjunction with the liner 2 the immediate mandrel, upon which the conductor coil of an induction unit may be fashioned. In the fashioning of the coil, the assembly shown in Fig. 5 is supported in the coiling machine, as indicated in Fig. 3. Then, the ends of the copper conductor bar 15 (Fig. 7) and the copper tubing 16 are brazed in side-by-side relation and the united ends are secured by a U-bolt 17 to the leg of the dog 9 that engages the axle 4 for rotation with the driven head 8 of the coiling machine. The coiling machine slowly rotates the mandrel assembly in the direction of the arcuate arrow in Fig. 7, and as the mandrel assembly so rotates the tubing 16 is brazed to the bar 15, say at the point 18. While a special brazing machine may be readily devised to do the job continuously, the fact is that I normally rotate the mandrel assembly intermittently; that is, the coil-winding rotation of the mandrel assembly is arrested and several inches of the tubing are brazed to the conductor bar in the vicinity of point 18. Then, the mandrel assembly is rotated, and the brazed length of tubing and bar is coiled upon the jacket 10. The rotation of the mandrel assembly is again arrested and a further length of tubing and bar are brazed, whereupon the coiling is again continued. So the operation is repeated until the desired water-cooled conductor is accurately and permanently wound and coiled upon the jacket 10 on the liner 2.

Figure 8:
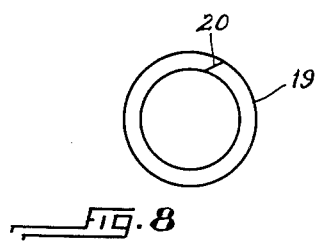
Fig. 8 is a view in plan of an insulation washer or gasket element used in the construction of the induction unit.

It is to be noted that between each of the otherwise laterally abutting turns of the coil is introduced a gasket of glass fabric, impregnated with insulating varnish, or a gasket of any other suitable electrical insulating material. A typical gasket 19 (shown in Fig. 8) is transversely split at 20, and in making the installation the gasket is spread at the split and placed over the body of the jacketed sleeve 2 and fitted snugly into place between the two particular turns of the coil. In the completely wound coil the gaskets, as thus interposed between the turns, form in effect a continuous helical gasket.

By virtue of the improvements herein described, the water-cooled conductor may be wound and shaped accurately upon the insulation-jacketed sleeve that forms an essential element of the completed induction unit. This results in great savings in labor and in time. Furthermore, the costly use of a glass stocking upon the entire length of the conductor is avoided.

Figure 9:
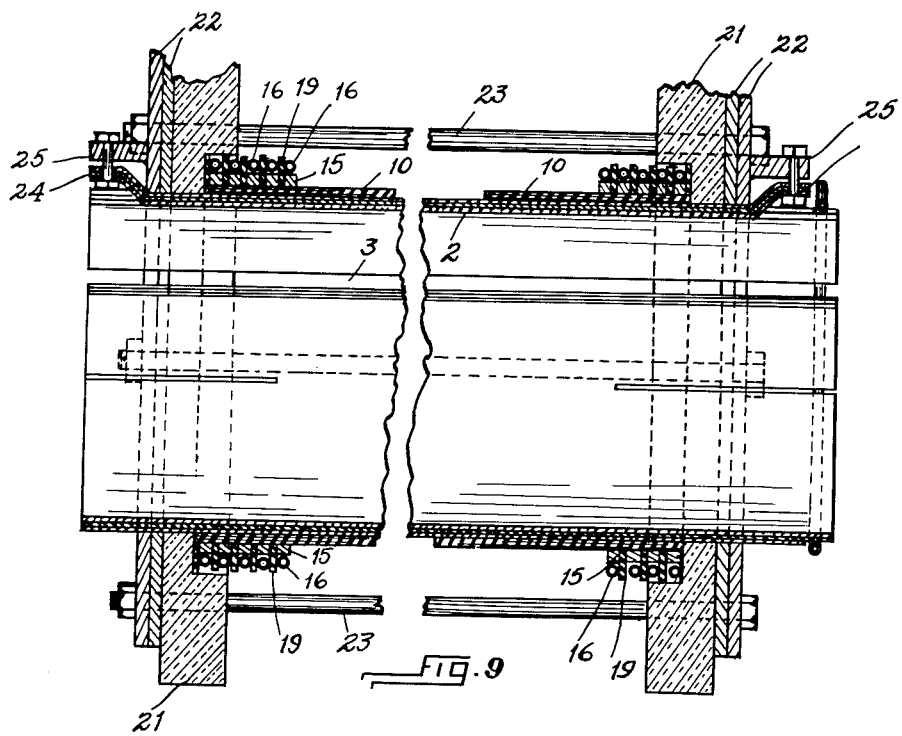
Fig. 9 is a fragmentary view in axial section and to larger scale of an induction coil unit constructed in accordance with this invention.

In Fig. 9 a complete induction unit is illustrated fragmentarily, wherein the sleeve 2 is shown to be of laminated construction, as illustrated and described in my copending patent application, Serial No. 329,390, filed January 2, 1953. The insulating jacket, that forms the mandrel surface upon which the conductor coil 15, 16 is permanently wound, is shown at 10, and the insulating strip or gasket elements inserted between the turns of the coil appear at 19. The conductor coil upon the jacketed liner is secured between two headers 21 of insulating board (such as Transite) externally reinforced by steel header plates 22, all rigidly integrated by means of clamping rods 23. The liner 2 is slit at its ends, to permit tangs 24 to be struck up after the headers 21 and plates 22 have been assembled upon the ends of the sleeve 2 that project outward from the jacket 10 upon which the conductor coil is wound. The outwardly set tangs are bolted to rigid lugs 25 on the header plates 22.

Aside from the savings in labor and cost of constructing induction coil units, it is to be noted that the interval (the so-called gap) between the inner face of the cylindrical copper coil and the internal surface of the liner 2 is substantially less than in prior structures. The less this interval is the greater will be the electrical efficiency obtained in inductively heating a billet placed within the liner, assuming of course that the billet is of the diameter and length for which the induction unit was designed. Additionally, the spacer gaskets or strips 19, used between the turns of the coil provide a much more compact coiled structure than is obtained through the prior use of the glass fabric sleeve applied to the conductor coil, and as a result a greater concentration of effective flux density is obtained per unit of electrical power input to the coil.

The axle 4 may be of any well-known expansible mandrel construction, whereby one and the same axle may be used to support the liners for various sizes of coil units, wherefore it is not necessary, as in the past, to construct a separate mandrel for each size coil manufactured.

It will be understood that modifications in the exemplary structure described, and variations of the method disclosed, may be made without departing from the spirit of the invention defined in the appended claims.

I claim:

1. In the manufacture of a low-frequency electrical induction unit for heating metal articles, the method which comprises coiling and securing upon the outer surface of a longitudinally split tubular metal liner a web of electrical insulating material and thereby forming of the liner a mandrel having a laminated insulating jacket, helically coiling upon the jacket of said mandrel an electrical conductor having a passage for cooling water, while installing a series of transversely split gaskets of electrical insulation end to end between the successive turns of the coil, and compressing the coil axially of the helix and securing the coil turns upon the latter insulation.

2. A low-frequency electrical induction unit for heating metal articles including an article-receiving tube comprised of an elongate conductor of low electrical resistance in the form of a helical coil, means combined with the tube for sustaining the article free from short-circuiting electrical engagement with successive turns of the coil, and means comprising a series of transversely split annular gaskets of electrical insulating material in which the successive gaskets are severally interposed between the successive turns of the coil, one end of each successive split gasket being assembled in substantial abutment upon an end of the next-succeeding split gasket in the series, whereby the series of gaskets form in effect a helix of insulating material in the assembled helical coil structure.

References Cited in the file of this patent

UNITED STATES PATENTS

| | | |
|---|---|---|
| 1,769,312 | Rollinson | July 1, 1930 |
| 2,201,005 | Ford | May 14, 1940 |
| 2,325,810 | Strickland | Aug. 3, 1943 |
| 2,338,775 | Martin | Jan. 11, 1944 |
| 2,471,869 | Gebel | May 31, 1949 |
| 2,490,106 | Strickland | Dec. 6, 1949 |
| 2,672,550 | Vaughan | Mar. 16, 1954 |
| 2,676,234 | Lackner et al. | Apr. 20, 1954 |